(12) United States Patent
Klaukien

(10) Patent No.: US 9,309,913 B2
(45) Date of Patent: Apr. 12, 2016

(54) FASTENING ARRANGEMENT AND FASTENING FITTING FOR FASTENING A COMPONENT TO A STRUCTURAL COMPONENT OF AN AIRCRAFT OR SPACECRAFT

(75) Inventor: Frank-Michael Klaukien, Ellerbek (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/993,621

(22) PCT Filed: Dec. 13, 2011

(86) PCT No.: PCT/EP2011/072556
§ 371 (c)(1),
(2), (4) Date: Jan. 2, 2014

(87) PCT Pub. No.: WO2012/080217
PCT Pub. Date: Jun. 21, 2012

(65) Prior Publication Data
US 2014/0186099 A1 Jul. 3, 2014

Related U.S. Application Data

(60) Provisional application No. 61/422,791, filed on Dec. 14, 2010.

(30) Foreign Application Priority Data

Dec. 14, 2010 (DE) .......................... 10 2010 063 076

(51) Int. Cl.
*F16B 17/00* (2006.01)
*F21V 21/08* (2006.01)
(Continued)

(52) U.S. Cl.
CPC .............. *F16B 17/002* (2013.01); *B64C 1/406* (2013.01); *F16B 11/006* (2013.01);
(Continued)

(58) Field of Classification Search
CPC ...... F21V 21/0808; F16M 13/00; A47G 1/17; B64G 1/66; F16B 17/002; F16B 11/006; B64C 1/406; Y10T 403/472; Y02T 50/46
USPC ......... 248/126, 200, 205.3; 244/117 R, 129.1
See application file for complete search history.

(56) References Cited

U.S. PATENT DOCUMENTS

| 4,576,664 | A | 3/1986 | Delahunty |
| 4,828,202 | A | 5/1989 | Jacobs et al. |

(Continued)

FOREIGN PATENT DOCUMENTS

| DE | 3409903 | 3/1984 |
| DE | 10010935 | 3/2000 |

(Continued)

OTHER PUBLICATIONS

International Search Report, Nov. 30, 2012.
(Continued)

*Primary Examiner* — Anita M King
(74) *Attorney, Agent, or Firm* — Greer, Burns & Crain Ltd.

(57) ABSTRACT

A fastening arrangement for fastening a component, in particular a cabin component, to a structural component of an aircraft or spacecraft, including a structural component which has a connection surface; a fastening fitting which has a geometry matched to the geometrical shape of the structural component, has a connection portion associated with the connection surface of the structural component and is produced from a thermoplastic injection-moulding material; and an elastomeric adhesive joint for stable fastening of the connection portion of the fastening fitting to the associated connection surface of the structural component. A corresponding fastening fitting and an aircraft or spacecraft comprising a fastening arrangement of this type and/or a fastening fitting of this type are also described.

19 Claims, 6 Drawing Sheets

(51) Int. Cl.
    *B64C 1/40*    (2006.01)
    *F16B 11/00*   (2006.01)
    *B64G 1/66*        (2006.01)
    *A47G 1/17*        (2006.01)

(52) U.S. Cl.
    CPC .............. *F21V 21/0808* (2013.01); *A47G 1/17* (2013.01); *B64G 1/66* (2013.01); *Y02T 50/46* (2013.01); *Y10T 403/472* (2015.01)

(56) References Cited

U.S. PATENT DOCUMENTS

| | | | |
|---|---|---|---|
| 5,822,918 A | 10/1998 | Helfman et al. | |
| 6,773,780 B2 * | 8/2004 | Hutter, III | 428/40.1 |
| 7,600,735 B2 | 10/2009 | Vaandrager et al. | |
| 8,678,332 B2 * | 3/2014 | Benthien et al. | 248/205.3 |
| 2005/0151038 A1 | 7/2005 | Packard et al. | |
| 2005/0284995 A1 | 12/2005 | Hutter, III | |
| 2007/0262219 A1 | 11/2007 | Hutter, III | |

FOREIGN PATENT DOCUMENTS

| | | |
|---|---|---|
| DE | 102008043816 | 11/2008 |
| WO | 0112456 | 2/2001 |
| WO | 2009037006 | 3/2009 |

OTHER PUBLICATIONS

German Office Action, Nov. 7, 2011.
Chinese Office Action, Jan. 4, 2015.

* cited by examiner

FASTENING ARRANGEMENT AND FASTENING FITTING FOR FASTENING A COMPONENT TO A STRUCTURAL COMPONENT OF AN AIRCRAFT OR SPACECRAFT

CROSS-REFERENCES TO RELATED APPLICATIONS

This application claims the benefit of the U.S. Provisional Application No. 61/422,791, filed on Dec. 14, 2010, and of the German patent application No. 10 2010 063 076.4 filed on Dec. 14, 2010, the entire disclosures of which are incorporated herein by way of reference.

FIELD OF THE INVENTION

The present invention relates to a fastening arrangement and a fastening fitting for fastening a component, in particular a cabin component, to a structural component of an aircraft or spacecraft.

Although applicable to any structural components, the present invention and the problem on which it is based will be described in detail with reference to a trapezium-shaped stringer of an aircraft.

BACKGROUND OF THE INVENTION

In an aircraft, cabin components, such as facing parts, overhead compartments or passenger seats, but also entire cabin units, such as a toilet unit, a kitchen unit or the like, must be fastened to the load-bearing fuselage of the aircraft. Aircraft fuselages are generally constructed from stringers and formers. The stringers extend substantially in the longitudinal direction of the aircraft, whereas the formers extend transverse to the stringers. The stringers and formers conventionally consist of aluminum and account for a considerable proportion of the total weight of the aircraft. Usually, the cabin components are mostly fastened to the formers and/or stringers by rivet or screw joints. For this purpose the formers and stringers are drilled in appropriate positions and a fastening fitting is then fastened by means of a rivet or screw in the drilled hole which has been produced. The operating and crash loads produced from the components are advantageously introduced into the aircraft fuselage by the fastening fittings.

Recently, efforts have been made also to use lighter carbon-fiber-reinforced plastics materials when producing the aircraft fuselage. In a CFRP aircraft fuselage of this type, at least the stringers are formed of a carbon-fiber-reinforced plastics material having a trapezium-shaped profile, whereas the formers are still made of aluminum. However, in a trapezium-shaped profile of this type it has proved disadvantageous that, owing to the lack of internal access, the conventional application method of riveting or screwing is not practicable. The application method of blind riveting is also entirely unsuitable. The CFRP structures comprise directional fibers which may disadvantageously be disturbed by the small closing head of a conventional blind rivet. Rivet joints in the CFRP structure are made using special rivets having special snap heads and closing heads and cannot be used, or can only be used with great effort, in hollow profiles without internal access.

Publication DE 10 2007 060 030 A1 describes a device for mounting electrical or fluid-conveying lines on a structure of an aircraft or spacecraft. The device described comprises a basic holder arrangement which can be fastened to a predetermined fastening portion of the structure. A system holder for mounting the systems is also provided and can be fastened to the basic holder arrangement in variable locations, based on the fastening portion. The advantage of this invention is that a route of a system can be varied in a flexible manner even during the finishing assembly. The system holder is fastened to the structure via associated chain-link basic holders, the individual chain-link basic holders being clipped to one another and fastened to the structure by means of a rivet joint.

Publication DE 10 2007 019 305 A1 describes a fastening arrangement for fastening a component to an aircraft fuselage. In this case, the component is fastened to an associated aircraft stringer via a fitting, specific engagement elements which are provided being brought into positive engagement with associated recesses.

SUMMARY OF THE INVENTION

One idea of the present invention is therefore to provide a fastening arrangement and a fastening fitting which eliminate the above-mentioned drawbacks and ensure stable fastening, associated with low labor costs, of the component to an associated structural component of the aircraft or spacecraft when the corresponding structural component is produced from a carbon-fiber-reinforced plastics material.

The idea on which the present invention is based is that the fastening arrangement comprises a structural component which comprises a connection surface; a fastening fitting which has a geometry matched to the geometrical shape of the structural component, has a connection portion associated with the connection surface of the structural component and is produced from a thermoplastic injection-molding material; and an elastomeric adhesive joint for stable fastening of the connection portion of the fastening fitting to the associated connection surface of the structural component. Consequently, owing to the matched geometries of the fastening fitting and the associated structural component, planar adhesion of the fastening fitting to the structural component, at least in portions, is ensured.

Through the present invention, cabin components can advantageously be fastened to trapezium-shaped CFRP stringers in a stable and cost-effective manner, in such a way that the operating and crash loads produced from the components are reliably introduced into the fuselage. Riveting and screwing can advantageously be dispensed with in the proposed fastening arrangement.

The present invention also has the advantage that, by means of the specified fastening arrangement, retrofitting can also take place in a simple manner even after sales. Even in the case of cabin configurations which differ from series production, such as in the VIP region or in the special first class region, a wide range of special equipment could also be provided subsequently by means of the proposed fastening arrangement.

Advantageous configurations of and improvements to the fastening arrangement are found in the dependent claims.

According to a preferred embodiment, the fastening fitting and the structural component have matched trapezium-shaped cross-sectional geometries and/or matched foot portions. As a result, a planar elastomeric adhesive joint between the fastening fitting and the underlying structural component is ensured, at least in portions.

According to another preferred embodiment, the fastening fitting comprises a predetermined number of metal inserts for receiving associated fastening means, which inserts are injected into a receiving portion and for example are arranged equidistant from one another and/or in rows of two. These integrally cast metal inserts serve as screw connection points to variable connection elements, intermediate elements or directly to the components to be connected. Consequently, the injected metal inserts represent stable screw connection intersection points. The arrangement and number of the individual metal inserts can be set freely and is preferably to be adapted to the respective application.

According to another preferred embodiment, the fastening fitting has, on the end face forming the back, at least one peel projection, preferably two peel projections arranged symmetrically to one another. These peel projections are used for additional adhesion of the fastening fitting to the portion of the structural component on which the main peel forces act, in order to strengthen the elastomeric adhesive joint.

According to another preferred embodiment, the fastening fitting comprises reinforcement ribs, adapted to the force flow, for increasing the rigidity of the fastening fitting. Owing to the injection-molding technology used, reinforcement ribs of this type can be provided in a very delicate manner, at low cost and with little labor. Furthermore, the individual walls of the fastening fitting and of the reinforcement ribs can be produced with low wall thicknesses, which advantageously results in additional weight saving potential. Consequently, a very light fuselage connection for cabin components can be provided in an advantageous manner.

According to another preferred embodiment, the fastening fitting has predetermined material recesses for reducing the total weight of the fastening fitting. This again results from the fact that the fastening fitting can be produced by injection molding, by means of which material recesses of this type can be provided in a simple and cost-effective manner.

According to another preferred embodiment, the fastening fitting is formed from the thermoplastic material polyetheretherketone, having a carbon fiber content of approximately 20-40%, in particular 30%. This injection-molding material ensures the production of a light but nevertheless rigid fastening fitting which is adapted to the high requirements for crash landings.

According to another preferred embodiment, the structural component is formed as a stringer comprising carbon-fiber-reinforced plastics material. However, it is obvious to a person skilled in the art that the structural component may also be any other structural component of an aircraft or spacecraft, provided that the corresponding geometries of the fastening fitting and of the respective structural component are matched.

According to another preferred embodiment, the fastening fitting comprises additional foot portions which are laterally offset in a stepped manner, extend laterally past the foot portions of the structural component and are used for additional adhesion of the fastening fitting to associated portions of the skin of the aircraft or spacecraft. As a result, disadvantageously occurring peel forces on the structural components can advantageously be prevented in such a way that a more stable fastening is advantageously ensured.

According to another preferred embodiment, the elastomeric adhesive joint is formed as a flexible, gap-filling elastomeric adhesive joint, for example made of BU, PUR, EP, EPPM or the like. By means of flexible elastomeric adhesive joints of this type, possible expansions and constraints can be compensated and an additional damping function can be ensured. The elastomeric adhesive used preferably has a tensile shear strength of 5 to 10 N/mm2, an adherent surface of 100 mm×100 mm transmitting a load of 5-10 t, which represents a sufficient dimensioning margin for the fastening fitting, which is designed for, for example, a load of 1 t. Furthermore, the elastomeric adhesive used is preferably adapted to the specific requirements in the intended field of use, for example to the service life and/or the Skydrol resistance.

According to another preferred embodiment, a wire insert is embedded in the elastomeric adhesive joint, preferably in the longitudinal direction of the fastening arrangement. In particular, the wire insert comprises at least one pull tab, preferably a pull tab at each of the two free and projecting ends, for actuating the wire insert for releasing the elastomeric adhesive joint. As a result, the individual fastening points and fastening fittings can be attached in a very variable manner and can subsequently be changed. As a result, special equipment can advantageously also be accommodated afterwards and existing cabins can subsequently be retrofitted in a simple manner.

According to another preferred embodiment, the fastening arrangement is designed for fastening connection elements, such as eye fittings, vibration dampers, such as rubber vibration dampers, or the like for attaching facing parts, overhead compartments, toilet units, kitchen units, cable and/or line carriers or the like to predetermined portions of the skin of the aircraft or spacecraft.

BRIEF DESCRIPTION OF THE DRAWINGS

The invention will be described in detail in the following by way of embodiments with reference to the accompanying figures of the drawings, in which.

In the figures, like reference numerals refer to like or functionally like components unless indicated otherwise.

DETAILED DESCRIPTION OF THE PREFERRED EMBODIMENTS

Figure 1:
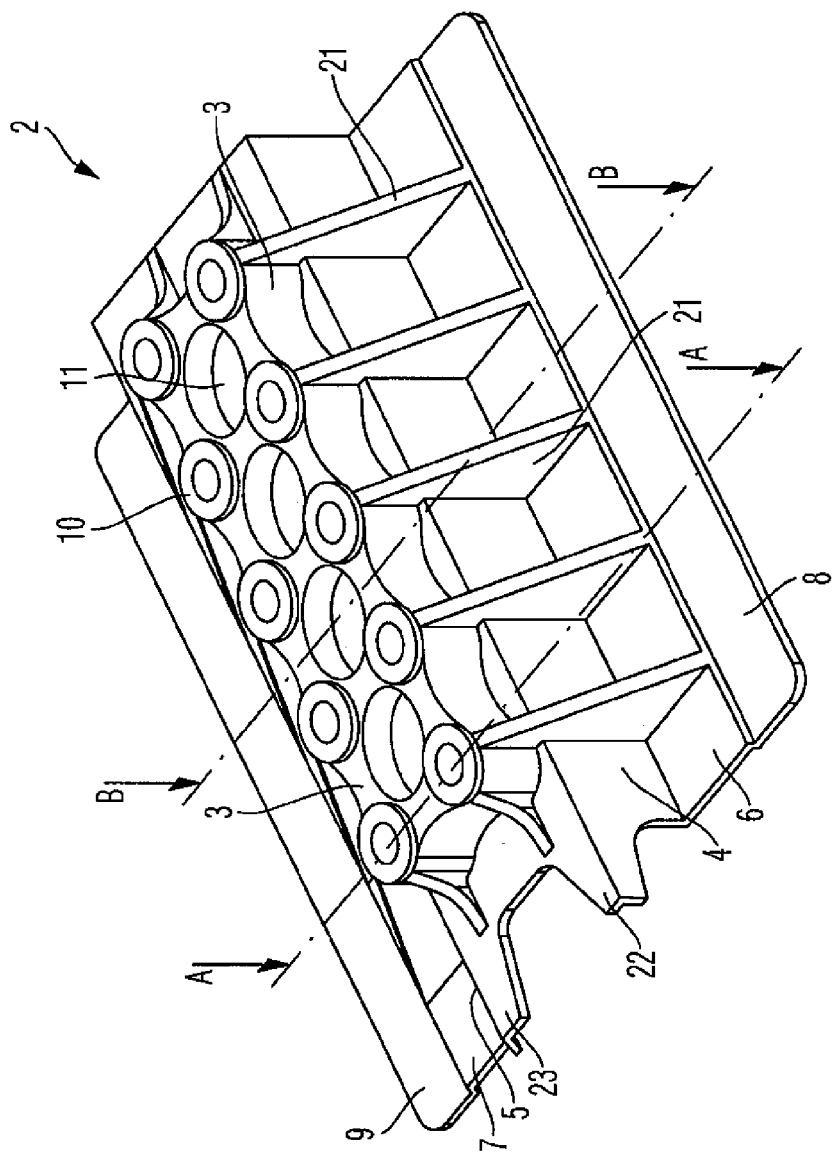
FIG. 1 is a perspective view of a fastening fitting according to a preferred embodiment of the present invention.
Figure 2A:
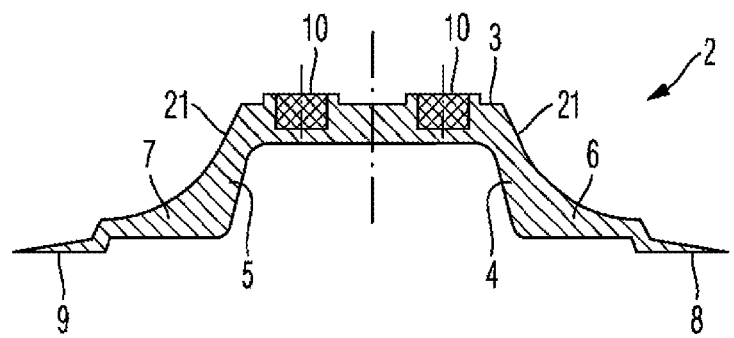
FIG. 2a is a cross-sectional view of the fastening fitting of FIG. 1 along the line A-A.
Figure 2B:
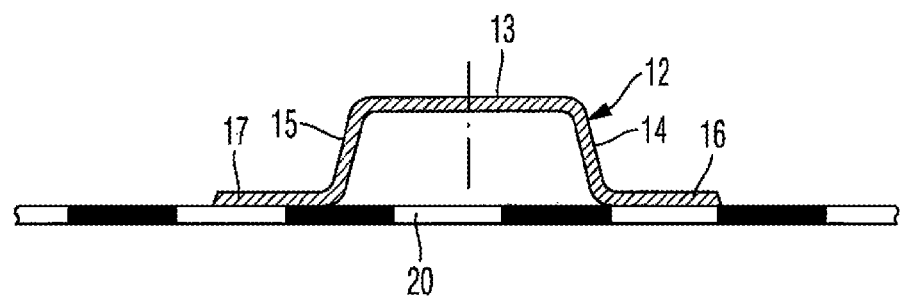
FIG. 2b is a cross-sectional view of a stringer according to a preferred embodiment of the present invention, applied to the aircraft skin.

A preferred embodiment of a fastening arrangement 1 for fastening a cabin component is described in detail below by way of example with reference initially to FIGS. 1 to 3. FIG. 1 is a perspective view of an exemplary fastening fitting 2 according to an embodiment of the present invention. FIGS. 2 and 3 are, respectively, cross-sectional views along the lines A-A and B-B of the fastening fitting 2 of FIG. 1 and cross-sectional views of the resulting fastening arrangement.

Figure 2C:
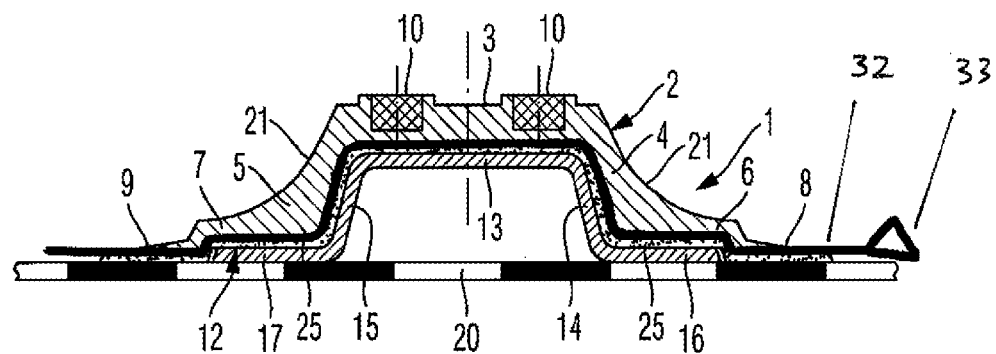
FIG. 2c shows a fastening arrangement consisting of the fastening fitting according to FIG. 2a and the stringer according to FIG. 2b.
Figure 3A:
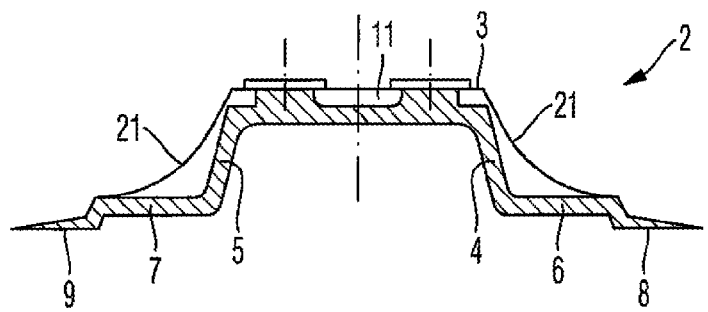
FIG. 3a is a cross-sectional view of the fastening fitting of FIG. 1 along the line B-B.
Figure 3B:
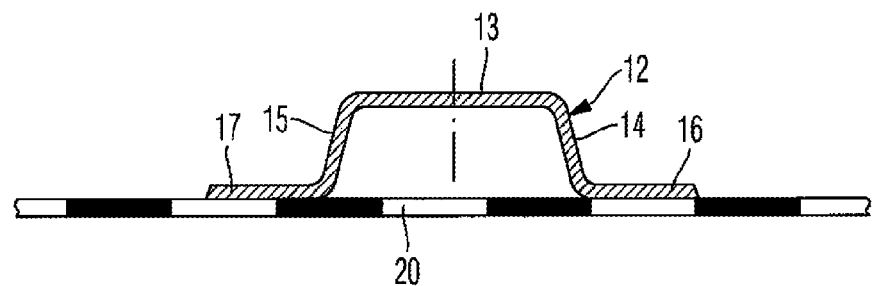
FIG. 3b is a cross-sectional view of a stringer according to a preferred embodiment of the present invention, applied to the aircraft skin.
Figure 3C:
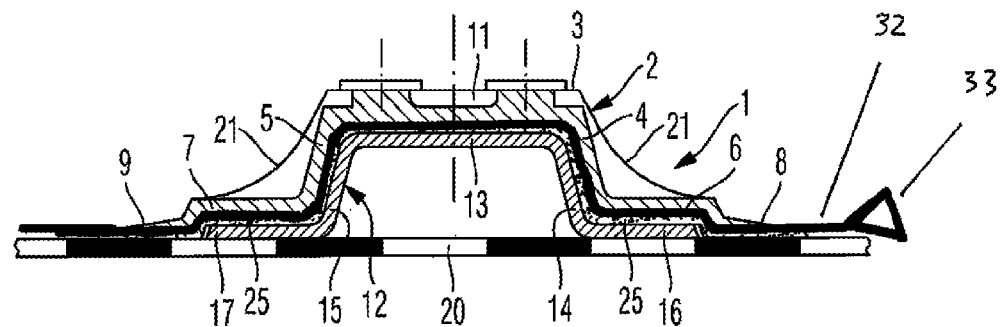
FIG. 3c shows a fastening arrangement consisting of the fastening fitting according to FIG. 3a and the stringer according to FIG. 3b.

As shown in FIGS. 1 to 3, the fastening fitting 2 according to the present embodiment is preferably formed with a trapezium-shaped cross-sectional geometry with a receiving portion 3, two lateral arm portions 4, 5, first laterally offset foot portions 6, 7 and second foot portions 8, 9 which in turn are offset in a stepped manner from the first foot portions 6, 7. The geometry of the fastening fitting 2 is preferably matched to the geometry of the associated trapezium-shaped stringer 12 in such a way that planar contact between the receiving portion 3 and an associated base surface 13 of the stringer 12, planar contact between the arm portions 4, 5 of the fastening fitting 2 and arm portions 14, 15 of the stringer 12 and between the first foot portions 6, 7 of the fastening fitting 2 and associated foot portions 16, 17 of the stringer 12 are ensured. In this respect, reference is made in particular to FIGS. 2c and 3c.

The second foot portions 8, 9 of the fastening fitting according to the present embodiment are preferably used for planar contact with an associated skin portion 20 of the fuselage of the aircraft. This is also shown in particular in FIGS. 2c and 3c.

The fastening fitting 2 further comprises, in the region of its receiving portion 3, a plurality of injected metal inserts 10. These metal inserts 10 are used for the better reception of connection means, for example of screws which can be brought into threaded engagement with the metal inserts 10, for connecting the respective cabin components or coupling elements. For example, the metal inserts 10 comprise for this purpose an internal thread with which corresponding fastening screws can be operatively connected to one another for mounting corresponding attachments. During the process of injection molding, the metal inserts 10 are preferably prefixed in the corresponding injection mold, the molding material then being poured around the metal inserts 10. This results in a stable injection of the metal inserts 10 into the receiving portion 3 of the fastening fitting 2. The number and the respective arrangement of the individual metal inserts 10 can be varied as desired and adapted to the respective application. According to the present embodiment of FIGS. 1 to 3, the fastening fitting 2 comprises a total of ten metal inserts 10 which are each spaced equidistant from one another and are arranged in succession in rows of two in the axial direction. For example, four metal inserts 10 are each arranged symmetrically and in the form of a square around a material recess region 11 of the fastening fitting 2. The individual metal inserts 10 are thus each integrally cast virtually in a tube and are used to provide variable connection points for the corresponding attachments. The metal inserts 10 consist for example of steel and/or titanium or a similarly hard material.

The fastening fitting 2 preferably further comprises a plurality of triangular reinforcement ribs 21 which each extend laterally from an integrally cast metal insert 10 to the outermost lateral extension of the first foot portions 6, 7, as shown in FIG. 1.

It is obvious to the person skilled in the art that the geometric shape, arrangement and number of the metal inserts 10, the material recess regions 11 and the reinforcement ribs 21 can be varied as desired and in a manner adapted to the respective application. At this point is also noted that it may sometimes be possible to omit the second foot portions 8, 9 or to form these second foot portions 8, 9 such that they are larger and extend further laterally, in such a way that a larger connection surface between the second foot portions 8, 9 of the fastening fitting 2 and an associated skin portion 20 is ensured, if desired.

The fastening fitting 2 further comprises for example two peel projections 22, 23 which in particular extend axially outwards on the end face, which in the case of adhesion to an associated skin portion 20 is orientated towards the rear of the aircraft. The peel projections 22, 23 are thus preferably provided on the end face of the fastening fitting 2 at which peel forces occur more frequently. By providing the peel projections 22, 23, peeling of this type can advantageously be prevented. The peel projections 22, 23 are preferably provided symmetrically to one another.

The fastening fitting 2 is preferably produced from a thermoplastic injection-molding material, for example from the thermoplastic material polyetheretherketone having a carbon fiber content of approximately 20 to 40%, in particular having a carbon fiber content of 30%. This material is tried and tested in aviation and aerospace technology and has proved particularly advantageous in this field of application. The fastening fitting 2 is preferably designed for medium loads up to 1 ton. The cabin fittings are designed horizontally for crash-landing conditions in particular with a gravitational acceleration factor of 9.

When using the thermoplastic material polyetheretherketone having a carbon fiber content of approximately 30%, the fastening fitting 2 may for example have a tensile strength of 185 N/mm2, a tensile modulus of elasticity of 21,000 N/mm2, a flexural strength of 280 N/mm2 and a flexural modulus of elasticity of 14,000 N/mm2. The heat deflection temperature of a fastening fitting 2 of this type is approximately 310° C.

By means of the above-mentioned injection-molding technology for producing the fastening fitting 2, a fitting which is adapted to the force flow and has delicate reinforcement ribs 21 and specially provided material recess regions 11 can be produced, which would be substantially more cost-intensive in the case of a milled or laminate part. Furthermore, owing to the injection-molding technology, the fastening fitting 2 according to the invention can be produced with an extremely low wall thickness, which advantageously results in additional weight saving potential. For example, a fastening fitting 2 of this type having a low weight of approximately 65 g can be produced. It is obvious to the person skilled in the art that the above-mentioned amounts are merely exemplary and may of course vary according to the respective application.

For weight-saving purposes, the fastening fitting 2 preferably consists of a thin layer thickness, such tubes for bordering as described above being provided merely in the region of the metal inserts 10, from which tubes the approximately triangular reinforcement ribs 21 extend sideways.

The cap-shaped structure of the fastening fitting 2, with in each case two first and second foot portions 6, 8; 7, 9 arranged in a step-like manner on each side of the fastening fitting 2, is preferably matched to the corresponding trapezium-shaped stringer shape in such a way that a conformal and planar mounting of the fastening fitting 2 on the associated stringer 12 is ensured for the intended bonding process.

As shown in FIGS. 2c and 3c, the fastening fitting 2 is preferably rigidly bonded to an associated portion of the trapezium-shaped stringer 12 and correspondingly associated portions of the skin 20 by means of an elastomeric adhesive joint 25.

The elastomeric adhesive joint 25 is for example formed as a flexible, gap-filling elastomeric adhesive joint, for example made of the material PUR, BU, EP, EPDM or the like. An elastomeric adhesive consisting of BU, which is easily soluble, or an elasticized epoxy adhesive EP, which is rather durable, are preferably to be used. As a result, any expansions and constraints between the components to be bonded can be compensated and a damping function can also be ensured. Depending on the material, the tensile shear strength of the elastomeric adhesive should be approximately from 5 to 10 N/mm2, in other words an adherent surface of for example 100 mm×100 mm would transmit a load of approximately 5 to 10 tons, which again for a fastening fitting designed for a load of 1 ton represents a sufficiently large dimensioning margin.

Elastomeric adhesive joints 25 of this type also ensure acoustic and thermal insulation and the above-mentioned damping in the case of mechanical loading. Furthermore, in the case of elastomeric adhesive joints 25 of this type advantageously no contact corrosion occurs in injection-molding and CFRP environments. The elastomeric adhesive used is preferably adapted accordingly to the service life and the Skydrol resistance for the specific requirements in the intended field of use. The layer thickness of the elastomeric adhesive joint used can be approximately 1 to 2 mm thick.

According to another preferred embodiment, during the process of bonding the fastening fitting 2 to the associated stringer portion, a wire insert 32 can already be incorporated, preferably in the longitudinal direction of the fitting 2, in order if necessary to be able to release the adhesive joint again subsequently in a simple and cost-effective manner and remove the fastening fitting 2 from the associated stringer and/or the associated skin portion and possibly displace it. This wire insert 32 consists for example of a steel wire having a thickness of approximately 0.3 mm. The wire insert 32 may preferably comprise at the two free wire ends suitable pull or actuation tabs 33, by means of which the user can accordingly pull the wire insert 32 through the adhesive joint using his/her fingers and release said joint. For this purpose the wire insert 32 preferably extends out from the adhesive joint in the longitudinal direction at the two end faces of the fastening arrangement 1 in such a way that two free wire ends having the above-mentioned pull or actuation tabs 33 are provided.

Some embodiments will be described briefly below with reference to FIGS. 4 to 8. However, it is obvious to the person skilled in the art that the given embodiments are not to be understood as exclusive; rather the above-described fastening fitting 2 and the described fastening arrangement 1 can be used for any conceivable applications.

Figure 4:
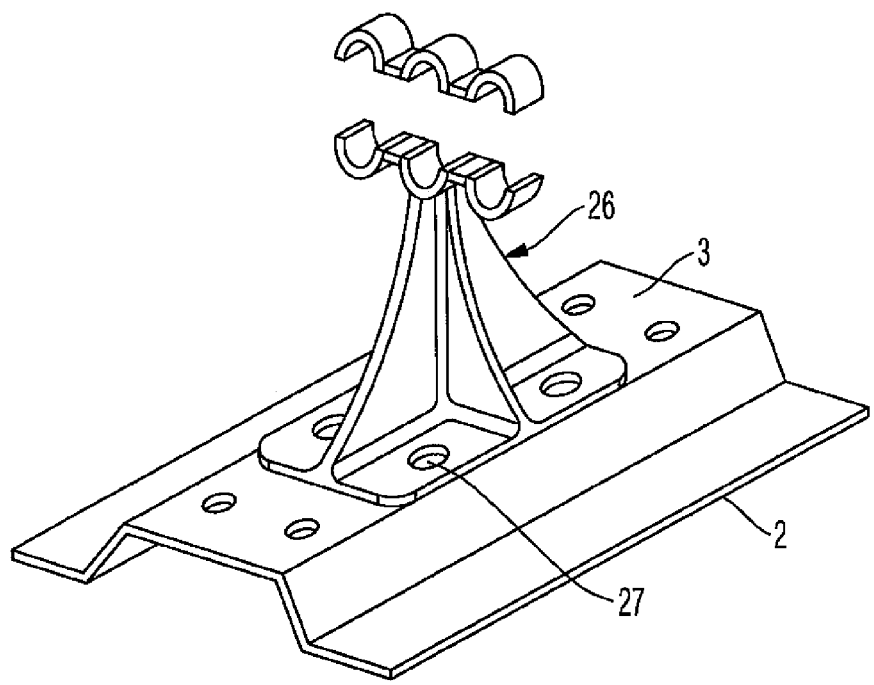
FIG. 4 is a perspective view of a fastening arrangement consisting of a fastening fitting and a cable carrier component according to an embodiment of the present invention.

FIG. 4 shows a first application by way of example, the illustrated fastening fitting 2 being shown in a simplified manner and differing geometrically from the above-described fastening fitting 2. However, the fastening fitting according to FIG. 4 can be formed analogously to the above-described fastening fitting 2. The above statements apply analogously for FIGS. 6 to 8 described below.

Figure 5:
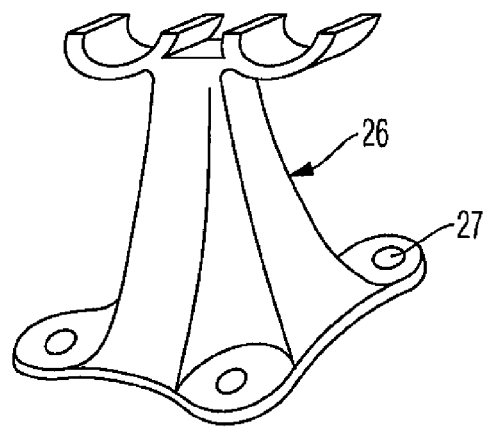
FIG. 5 is a perspective view of a cable carrier component according to another preferred embodiment of the present invention.
Figure 6:
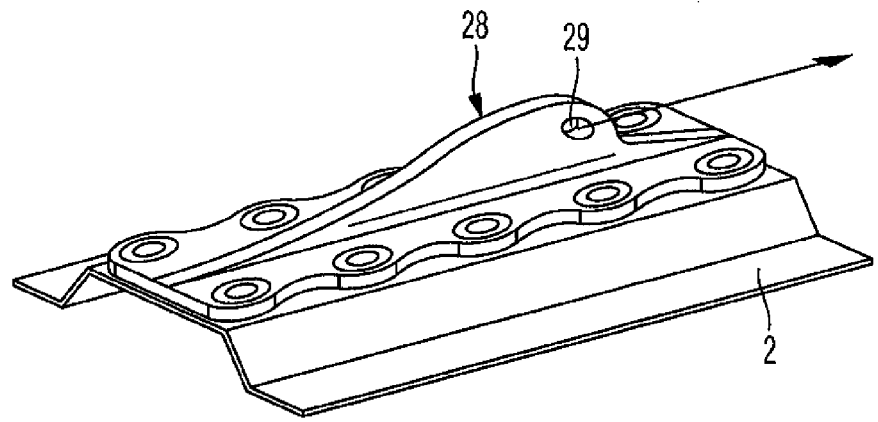
FIG. 6 is a perspective view of a fastening arrangement consisting of a fastening fitting and a connection component according to an embodiment of the present invention.

For example, a cable carrier 26, produced as a milled part according to FIG. 4 or as a hollow injection-molded part according to FIG. 5, is screwed to the corresponding fastening fitting 2 by means of corresponding connection holes 27 comprising the metal inserts 10 or other fastening holes. In this case, the connection holes 27 of the cable carrier 26 are preferably provided in such a way that they are aligned with the corresponding threaded portions of the metal insert 10 or the specially provided fastening holes of the fitting 2 when the cable carrier is applied to the fastening fitting 2 which is bonded to the stringer. Consequently, a screw connection between the cable carrier 26 and the fastening fitting 2 can be produced in a simple manner.

Further coupling pieces can also be screwed directly onto the fastening fitting 2, such as an eye fitting or an X-load fastening element 28 for absorbing tensile forces in the X-direction or the like. For example, carrier bars for carrying storage compartments, facing parts or the like may be provided on these X-load fastening elements 28 in the eye 29 provided for this purpose.

Figure 7:
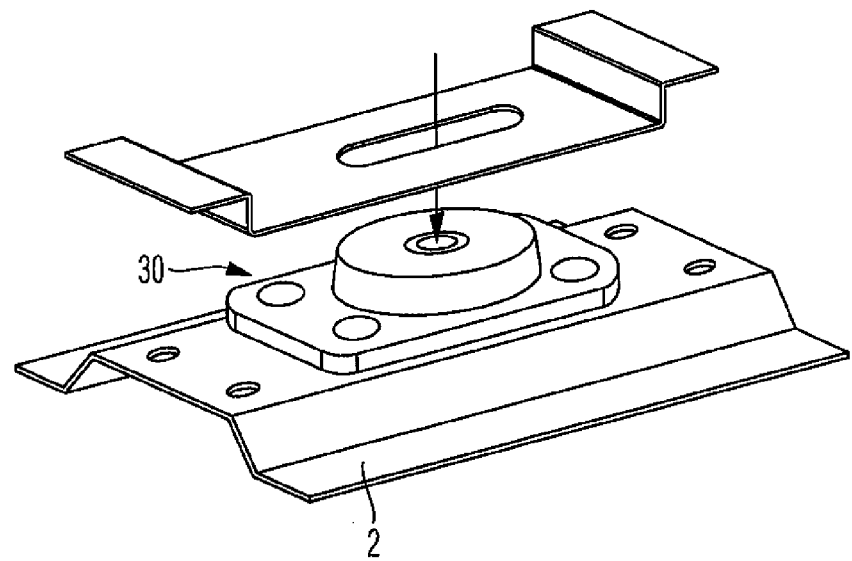
FIG. 7 is a perspective view of a vibration damper according to a preferred embodiment of the present invention, attached to a fastening fitting.

FIG. 7 shows the coupling element by way of example as a damping element 30, the corresponding attachments in turn being coupled to this damping element 30.

With regard to the fastening of the X-load fastening element 28 and the damping element 30 to the associated fastening fitting 2, reference is made to the statements in relation to FIG. 4.

Figure 8:
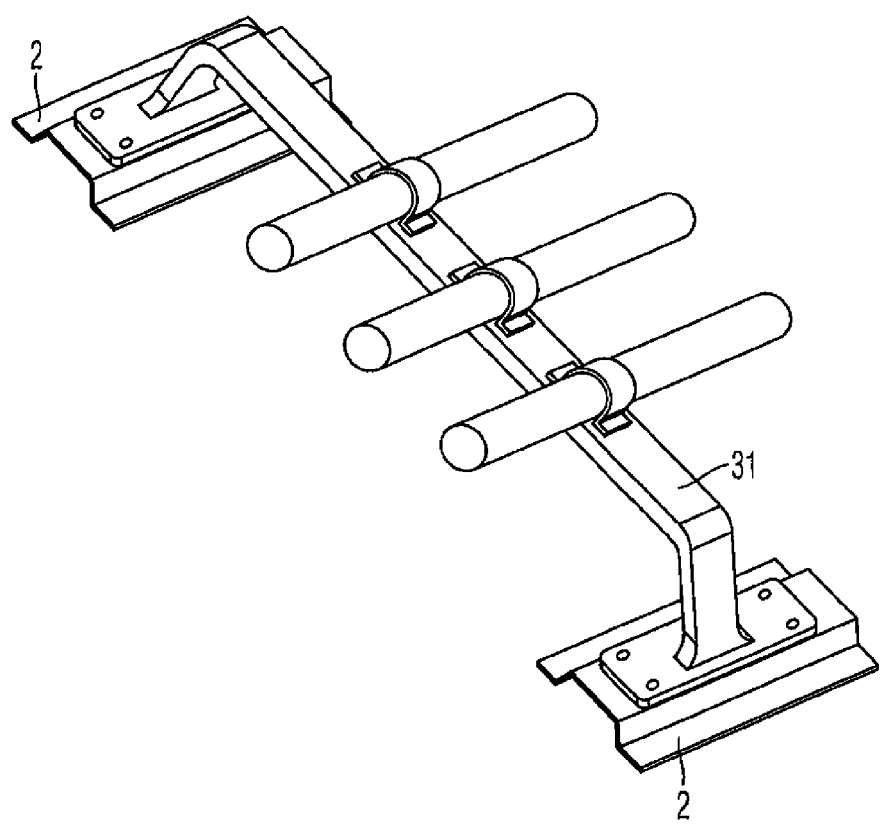
FIG. 8 is a perspective view of a fastening arrangement consisting of two fastening fittings and a cable carrier component according to a preferred embodiment of the present invention.

FIG. 8 is a perspective view of a further embodiment, in this case the connection element being formed as a transverse cable carrier web 31 having two carrier feet. For this purpose the feet of the cable carrier web 31 are each screwed to a fastening fitting 2.

It is obvious to a person skilled in the art that the respective attachments can be attached simultaneously to any number of fastening fittings 2, or a plurality of attachments or coupling elements can also be attached to one fastening fitting 2, if this is reasonable in the corresponding application.

Although the present invention has been described herein with reference to preferred embodiments, it is not limited thereto, but can be modified in a variety of ways.

The present invention consequently provides a fastening arrangement by means of which attachments can be attached in a simple and cost-effective manner to associated stringers consisting of a CFRP material, in such a way that said attachments can be retrofitted or removed and displaced if required. By combining the fastening fitting produced from a thermoplastic injection-molding material with the provided elastomeric adhesive joint, it is possible to produce a fastening arrangement having a low structural weight and a flexible and subsequently alterable arrangement which can sufficiently absorb the respective forces occurring in the aircraft region. Consequently, retrofitting can take place even after sales and, in the case of cabin configurations which differ from series production in the VIP region or special first class region, a wide range of special equipment can be provided in a simple and cost-effective manner.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A fastening arrangement for fastening a component, in particular a cabin component, to a structural component of an aircraft or spacecraft, comprising:
   a structural component with a geometrical shape and which comprises a connection surface;
   a fastening fitting which has a geometry matched to the geometrical shape of the structural component, has a connection portion associated with the connection surface of the structural component and is produced from a thermoplastic injection-molding material, wherein the fastening fitting and the structural component have matched trapezium-shaped cross-sectional geometries and matched foot portions; and
   an elastomeric adhesive joint for stable fastening of the connection portion of the fastening fitting to the associated connection surface of the structural component.

2. The fastening arrangement according to claim 1, wherein the fastening fitting comprises a predetermined number of metal inserts for receiving associated fasteners, which inserts are injected into a receiving portion.

3. The fastening arrangement according to claim 2, wherein the inserts are arranged at least one of equidistant from one another and in rows of two.

4. The fastening arrangement according to claim 1, wherein the fastening fitting has, on the rear end face, at least one peel projection.

5. The fastening arrangement according to claim 4, wherein two peel projections are arranged symmetrically to one another.

6. The fastening arrangement according to claim 1, wherein the fastening fitting comprises reinforcement ribs for increasing the rigidity of the fastening fitting.

7. The fastening arrangement according to claim 1, wherein the fastening fitting comprises predetermined material recesses for reducing the total weight of the fastening fitting.

8. The fastening arrangement according to claim 1, wherein the structural component comprises foot portions and the fastening fitting comprises additional foot portions which are laterally offset in a stepped manner, extend laterally past a lateral extension of the foot portions of the structural component and are used for additional adhesion of the fastening fitting to associated portions of a skin of the aircraft or spacecraft.

9. The fastening arrangement according to claim 1, wherein the fastening fitting is formed from the thermoplastic material polyetheretherketone, having a plastics material fiber content of approximately 20-40%.

10. The fastening arrangement according to claim 1, wherein the structural component is formed as a stringer comprising carbon-fibre-reinforced plastics material.

11. The fastening arrangement according to claim 1, wherein the elastomeric adhesive joint is formed as a flexible, gap-filling elastomeric adhesive joint.

12. The fastening arrangement according to claim 11, wherein the elastomeric adhesive joint comprises at least one of polyurethane, epoxy resin or ethylene-propylene-dien-rubber.

13. The fastening arrangement according to claim 1, wherein a wire insert is embedded in the elastomeric adhesive joint, preferably in the longitudinal direction of the fastening arrangement, in such a way that two free ends of the wire insert project laterally from the elastomeric adhesive joint.

14. The fastening arrangement according to claim 13, wherein the wire insert comprises at least one pull tab for actuating the wire insert for releasing the elastomeric adhesive joint and the wire insert having the at least one pull tab is freely accessible from outside the fastening arrangement.

15. The fastening arrangement according to claim 1, wherein the fastening arrangement is designed for fastening connection elements and damping element for attaching at least one of facing parts, kitchen elements, storage compartment elements, toilet elements, cable and line carriers to predetermined portions of a skin of the aircraft or spacecraft.

16. An aircraft or spacecraft comprising a fastening arrangement according to claim 1.

17. A fastening fitting for fastening a component to a trapezium-shaped structural component of an aircraft or spacecraft, wherein the fastening fitting comprises a thermoplastic injection-molding material and has an approximately trapezium-shaped geometry which is matched to the trapezium-shaped geometry of the structural component to ensure planar adhesion of at least portions of the fastening fitting to the structural component, wherein the fastening fitting comprises a central receiving portion, a first lateral arm portion arranged at a first longitudinal end portion of the central receiving portion and a second lateral arm portion arranged at a second longitudinal end portion of the central receiving portion, first laterally offset foot portions arranged adjacent to said first and second lateral arm portions, said first laterally offset foot portions at respective longitudinal end portions thereof merging into second foot portions, which in turn are offset in a stepped manner from the first foot portions such that said fastening fitting is adapted to provide a form fit with said trapezium-shaped structural component completely encasing said trapezium-shaped structural component, and wherein the fastening fitting comprises in the region of its central receiving portion, a plurality of injected metal inserts comprising an internal thread for receiving fastening screws for mounting said component.

18. A fastening fitting according to claim 17 wherein said component comprises a cabin component for the aircraft or spacecraft.

19. An aircraft or spacecraft comprising a fastening fitting according to claim 17.

* * * * *